2,773,048
EPOXY RESIN COMPOSITION CONTAINING PARA, PARA' DIAMINO DIPHENYLMETHANE

Jerome L. Formo, Lionel H. Le Gault, Luther L. Bolstad, and Arthur D. Sinning, Minneapolis, Minn., assignors to Minneapolis-Honeywell Regulator Company, Minneapolis, Minn., a corporation of Minnesota No Drawing. Application August 25, 1952, Serial No. 306,306

21 Claims. (Cl. 260—37)

This invention relates to resin-containing molding compositions including epoxy ether condensation polymers having the following structure

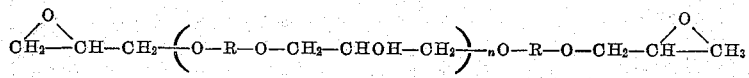

wherein $n$ stands for a number (such as 1, 2, 3, etc.) and R stands for the divalent hydrocarbon radical of a dihydric phenol [such as mononuclear phenols like catechol, resorcinol and hydroquinone or polynuclear phenols like bis-(4-hydroxyphenyl)-2,2-propane ("bis-phenol"), 4,4'-dihydroxy benzophenone, bis-(4-hydroxyphenyl)-1,-1-ethane, bis-(4-hydroxyphenyl)-1, 1-isobutane, bis-(4-hydroxyphenyl)-2,2, butane, bis-(4-hydroxy-2,2-methylphenyl)-2,2-propane, bis-(4 - hydroxy - 2 - tertiary butyl phenyl-2,2-propane, bis-(2-dihydroxynaphthyl)-methane, 1,5-dihydroxynaphthalene, and the like]. Such epoxy ethers are described in the patents to Bradley No. 2,500,600 and to Newey No. 2,553,718, and reference is made to these patents for descriptions of these resins and methods of preparing the same. Epoxy ether resins made by condensing epichlorhydrin and bis-(4-hydroxyphenyl)-2,2-propane ("bis-phenol") are available commercially.

An important object of the present invention is to provide a heat curable molding composition including an epoxy ether resin which composition will not set up or cure at room temperature (in other words, will be characterized by a long "shelf life"); which will not adhere, when set or cured, to the surface of the mold (whether made of metal or other material) within which the molding operation is carried out; and which, when set or cured, will be characterized by extremely high electrical insulation resistance, high impact resistance and low moisture absorption.

A specific object of this invention is to provide a molding composition of the nature indicated which when cured or set is characterized by distinct heat conductive properties.

Another specific object of the invention is to provide a molding composition of the nature indicated modified so as to render the set or cured material electrically conductive, the electrical conductivity being uniform throughout the cured or set material.

Other and further objects and features of the present invention will become apparent from the following description and appended claims.

The molding compositions according to the present invention comprise an epoxy resin (preferably made by reacting epichlorhydrin and "bis-phenol") characterized by having the number designated in the above-noted structural formula as "$n$" falling within the range of from more than 0 up to about 20. It should be noted, in this connection, that the epoxide resins in question are mixtures of compounds each having the indicated structure, and that the number herein designated as "$n$" is the average of the integral numbers "$n$" which characterize each compound making up these mixtures.

If desired, the epoxy resin content of the molding composition may be distributed between several epoxy resins having "$n$" numbers of different values, as long as the average of these numbers falls within the above disclosed range, due allowance being made for the proportion of the several epoxy resins.

The epoxy resin content of the molding compositions may range from 5 to 60% (by weight of the molding compositions) or more.

The molding compositions of the present invention also comprise para, para' diamino diphenylmethane in an amount ranging from 3 to 20% by weight of the epoxide resin. The ratio of epoxide resin to diamino diphenylmethane is preferably regulated according to the magnitude of the number "$n$" characterizing the epoxy resin, as tabulated:

| "$n$": | Percent amine |
|---|---|
| 0 | 25±5 |
| 2.5 | 10±2 |
| 12 | 6.25±2 |
| 20 | 1.5±1 |

At values of "$n$" falling between the tabulated values, the amount of amine is adjusted proportionally.

It is believed that when the above disclosed mixtures of epoxide resins and diaminodiphenylmethane are heat-cured, there takes place a cross linkage through reaction of the active hydrogens of the amines with the epoxide groups. The resulting compounds are of novel chemical structure, which explains the unusual properties of the heat-cured materials prepared according to the present invention.

The molding compositions of the present invention further include conventional fillers or pigments such as glass fibers or granules, asbestos, silica, perlite, biotite or mica, titanium dioxide, chrome yellow, zinc oxide, walnut shell, wood flour, carbon black, acetylene black or resinous material such as nylon fiber. As disclosed hereinbelow, the incorporation of acetylene black or like electrically conducting materials and of titanium dioxide or like heat conducting materials leads to the formation of resinous materials having unique properties.

The amount of fillers or pigments included with our molding compositions may be varied from 20% or less up to as much as 95% depending upon the properties desired in the heat-cured material and upon the specific fillers and/or pigments employed. The particle size distribution of the fillers is often the factor determining the amount to be used for a particular purpose. Good results have been obtained by using various fillers in the percentages (by weight of the molding composition) tabulated as follows:

| | Percent |
|---|---|
| Wood flour | 40–75 |
| Walnut shell flour | 40–75 |
| Silica flour | 50–90 |
| Nylon fibers | 36–95 |
| Glass fiber | 60–82 |
| Asbestos | 50–75 |
| $TiO_2$ | 20–50 |

It should be understood that the molding compositions may comprise a mixture of several fillers and/or pigments.

The moisture content of the molding compositions should be less than 1% (by weight) and preferably less than 0.5%.

In connection with the preparation of our molding composition, it should be noted that epoxy resins having "n" at least equal to 2 are solids. But resins having "n" equal to 1 are liquids. When only solid epoxy resins are included, all the ingredients may be mixed in dry form, as by milling on a two roller mill. However, when fibrous fillers are included, we prefer to dissolve the resin in a suitable solvent (such as acetone) and to impregnate the fibrous filler with this solution before the ingredients of the molding composition are milled or otherwise mixed. It is, of course, always possible, even when only solid ingredients are present in the final molding mixture, to dissolve the resin or resins in solvents and to mix the resulting solutions with the remaining (dry) ingredients. Best results are obtained by simply mixing all the ingredients on a two roller mill, the diamino diphenylmethane being added last, the resin being dissolved in a solvent whenever fibrous fillers are employed. When no solvent is used, any fibrous fillers are added gradually to the other ingredients.

Whenever solvents are used in making up our molding compositions, provision is made for removing such solvents, as by milling until the solvents have evaporated, or by drying the solvent-containing molding composition subsequent to its preparation, or by using molds having suitable breathing apertures.

The resulting molding compositions are characterized by an exceptionally long, heretofore unobtainable shelf life. Samples have been kept for nine months and longer periods without showing any evidence of curing or setting. For all practical purposes, our molding compositions may be considered as meeting any and all requirements that may possibly be encountered.

In spite of their long shelf lives, our molding compositions set or cure quickly when molded at an elevated temperature. The cure time ranges from 15 seconds (when the molding composition is preheated) up to 10 minutes (when particularly slow setting epoxy resins are molded without any preheating). The average cure time is from 3 to 5 minutes. The curing temperature ranges from 250° to 380° F. and usually falls within the range of from 280° to 350° F. The preferred range is from 300° to 315° F. The molding pressure ranges from 10 to 2000 pounds per square inch, depending on the solvent content (if any) of the molding composition, preheating (if any) of the molding composition, molding temperature, and other factors. Generally, enough pressure is used to form the molding composition into a solid or dense product. At a temperature of from 250° to 350° F., the molding pressure will ordinarily range upwardly from 100 pounds per square inch.

Any conventional molds may be used, such as the well-known compression and transfer molds usually employed for molding resins.

Setting or curing in the mold takes place with the exothermic generation of much less heat than is encountered in the conventional molding of other thermosetting resins. Articles thicker than one inch or weighing more than 100 grams can be made without any trouble due to exothermic heat generation, whereas if the same articles were made by conventional methods from conventional molding compositions the temperature would rise to 450° F. or higher.

After molding has been completed, the molded articles are easily released from the molds (whether made of metal or other material). In other words, there is no trouble due to adhesion of the molded articles to the mold surfaces.

The molded articles prepared as disclosed hereinabove are characterized by highly desirable properties not heretofore obtainable in combination. Thus, moisture absorption is less than ¼% and can be reduced to 0.1% or less. The electrical insulation resistance can be made to exceed 100,000 megohm-cm. The impact strength exceeds 0.5 ft. lbs./in. of notch (Izod) and can be made to exceed 5.0. When titanium dioxide (in an amount of more than 50% by weight of the molding composition) is used as a filler, the molded articles are characterized by a remarkable heat conductivity coupled with high electrical insulation resistance and high impact strength. When acetylene black (in amounts ranging from 8 to 10% or more by weight of the molding composition) or other electrically conducting materials are used as fillers, the molded products are electrically conducting, and this conductance is uniform throughout the articles. Such uniform conductivity has heretofore never been obtained in molded resinous articles.

Specific examples of molding compositions according to the present invention are given hereinbelow. In these specific examples, we used epoxy resins prepared from epichlorhydrin and "bis-phenol." Epoxy resin No. 1 had "n" equal to 2.5. Epoxy resin No. 2 had "n" equal to about .3. Epoxy resin No. 3 has "n" equal to about 12. The diamino diphenylmethane is indicated in the following table as "D. A. D. P. M."; molding temperature was from 300° to 315° F.; molding pressure, from 150 to 300 pounds per square inch; and molding time, from 3 to 5 minutes:

| Comp. No. | Percent by Weight | | | | | | | | |
|---|---|---|---|---|---|---|---|---|---|
| | Resin #1 | D. A. D. P. M. | Resin #2 | Resin #3 | Nylon Fiber | Glass Fiber | Asbestos | Silica Flour | Perlite |
| 1 | 30.0 | 6.67 | 13.33 | | 10.0 | 33.33 | | | |
| 2 | 33.33 | 7.4 | 14.8 | | 18.5 | | 18.5 | | |
| 3 | 30.0 | 6.67 | 13.33 | | 16.67 | | | 30 | |
| 4 | 30.0 | 6.67 | 13.33 | | 23.33 | | | | 23.33 |
| 5 | 30.0 | 6.67 | 13.33 | | 10.0 | 36.67 | | | |
| 6 | 45.5 | 4.5 | | | 15.0 | | | 31.5 | |
| 7 | 47.69 | 4.76 | | | 47.67 | | | | |
| 8 | 18.0 | 2.0 | | | | | | | |
| 9 | 22.5 | 5.0 | 10.0 | | | | | 52.0 | Acetylene Black 12.5 |
| 10 | | 5.0 | 11.4 | 34.0 | | | | | |
| 11 | | 8.0 | 16.5 | 27.5 | | | | | |
| 12 | | 5.2 | 13.5 | 30.5 | 16.9 | | | 30.5 | |

| Comp. No. | Percent by Weight | | | Physical Properties | | | | |
|---|---|---|---|---|---|---|---|---|
| | Biotite or Mica | TiO$_2$ | Walnut Shell Flour | Flexural Strength | H$_2$O Absorption, Percent | Izod Impact Strength | Insulation Resistance, megohm cm. | Mold Shrinkage, inches per inch |
| 1 | 3.33 | 3.33 | | 11,700 | 0.14 | 0.94 | 220,000 | 0.0047 |
| 2 | 3.7 | 3.7 | | 10,100 | 0.18 | 0.90 | 190,000 | 0.0043 |
| 3 | | 3.33 | | 13,900 | 0.11 | 0.67 | 160,000 | 0.0039 |
| 4 | | 3.33 | | | 0.11 | | 115,000 | |
| 5 | | 3.33 | | | 0.12 | | 230,000 | |
| 6 | | 3.5 | | | 0.12 | | 110,000 | |
| 7 | | | | 10,400 | 0.23 | 14.87 | 54,000 | 0.003 |
| 8 | 80.0 | | | | | 0.66 | | |
| 9 | | | | | | | | |
| 10 | | | 49.6 | | | | | |
| 11 | | 24.0 | 24.0 | | | | | |
| 12 | | 3.4 | | | | | | |

Articles molded from composition No. 8 had a heat conductivity of $14 \times 10^{-4}$ cal./sec./cm.$^2$/° C. Articles molded from composition No. 9 had a uniform resistivity of 270 to 500 ohms-centimeter.

Results similar to those disclosed in the above specific examples were obtained when proceeding in exactly the same manner except for substituting, in place of resin No. 1, epoxy resins made with "bis-phenol" and having "$n$" equal, respectively, to 6 and to 12. The same applies to other epoxy resins made with other dihydric phenols.

Many details of composition and procedure may be varied without departing from the principles of this invention. It is, therefore, not our purpose to limit the patent granted on this application otherwise than necessitated by the scope of the appended claims.

We claim:

1. A composition of matter comprising para, para' diamino diphenylmethane together with an epoxy resin having the structural formula

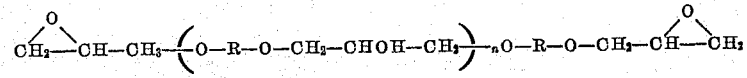

wherein R stands for the hydrocarbon radical of a dihydric phenol and $n$ stands for a number ranging from more than 0 up to about 20, the said diamino compound being commingled with said epoxy resin in an amount ranging from ½ to 30% by weight of said resin.

2. A composition according to claim 1 in which the amount of said diamino compound is correlated with the magnitude of the said number represented by "$n$" in said formula according to the following table

| "$n$" | Percent diamino compound |
|---|---|
| 0 | 20–30 |
| 2.5 | 8–12 |
| 12 | 4.25–8.25 |
| 20 | .5–2.5 | the amount of said diamino compound being proportionally adjusted for other values of "$n$".

3. A composition according to claim 1 in which R stands for the hydrocarbon radical of bis-(4-hydroxyphenyl)-2,2-propane.

4. A composition according to claim 1 comprising titanium dioxide as a filler.

5. A composition according to claim 1 comprising acetylene black as a filler.

6. A method of making a molded resinous article which comprises providing a composition according to claim 1 and subjecting the said composition to heat and pressure.

7. A composition according to claim 2 in which R stands for the hydrocarbon radical of bis-(4-hydroxyphenyl)-2-2 propane.

8. A composition according to claim 2 comprising titanium dioxide as a filler.

9. A composition according to claim 2 comprising acetylene black as a filler.

10. A method according to claim 6 in which said pressure ranges from 10 to 2000 pounds per square inch, said pressure being applied for from 15 seconds to 10 minutes, said pressure being applied at a temperature of from 250° to 380° F.

11. As a novel chemical composition, the end product of the process according to claim 6.

12. A composition according to claim 7 comprising titanium dioxide as a filler.

13. A composition according to claim 7 comprising acetylene black as a filler.

14. A composition according to claim 7 comprising a filler in an amount of from 20 to 95% of the total weight of said composition.

15. A composition according to claim 7 comprising two epoxy resins having "$n$" numbers of different values.

16. A method of making a molded resinous article characterized by heat conductivity which comprises providing a composition according to claim 8 and subjecting the said composition to heat and pressure.

17. A method of making a molded resinous article characterized by uniform electrical conductivity which comprises providing a composition according to claim 9 and subjecting said composition to heat and pressure.

18. A molded resinous article prepared according to the method of claim 16.

19. A molded resinous article prepared according to the method of claim 17.

20. An article according to claim 19 having an acetylene black content ranging upwardly from 8% by weight and comprising at least two epoxy resins having "$n$" numbers of different values.

21. A composition according to claim 1 comprising a filler in an amount of from 20 to 95% of the total weight of said composition.

References Cited in the file of this patent

UNITED STATES PATENTS 2,668,807  Greenlee _____ Feb. 9, 1954

FOREIGN PATENTS 930,609  France _____ Aug. 18, 1947
278,476  Switzerland _____ Jan. 16, 1952

OTHER REFERENCES

"The Chemistry of Commercial Plastics" by Wakeman, published 1947, by Reinhold Publishing Corp., page 545.